(12) United States Patent
Belcher et al.

(10) Patent No.: US 8,579,445 B2
(45) Date of Patent: Nov. 12, 2013

(54) PLASTIC GLASS MOUNTING AND RETENTION DEVICE

(75) Inventors: Simon Belcher, South Plympton (AU); Garry Gordon Leslie Fimeri, Morphett Vale (AU)

(73) Assignee: SMR Patents S.a.r.l., Luxembourg (LU)

( * ) Notice: Subject to any disclaimer, the term of this patent is extended or adjusted under 35 U.S.C. 154(b) by 146 days.

(21) Appl. No.: 13/243,124

(22) Filed: Sep. 23, 2011

(65) Prior Publication Data

US 2012/0134041 A1    May 31, 2012

(30) Foreign Application Priority Data

Nov. 29, 2010   (EP) ..................................... 10192829

(51) Int. Cl.
*G02B 7/182*   (2006.01)
(52) U.S. Cl.
USPC ......................................................... 359/872
(58) Field of Classification Search
USPC .................. 359/871, 872, 874, 877
See application file for complete search history.

(56) References Cited

U.S. PATENT DOCUMENTS 6,039,449 A * 3/2000 Dolan et al. .................. 359/871

FOREIGN PATENT DOCUMENTS

| EP | 0838598 | 4/1998 |
|---|---|---|
| EP | 0864465 | 9/1998 |
| EP | 2112022 | 4/2010 |
| GB | 1534599 | 12/1978 |
| JP | 2008032040 | 2/2008 |

OTHER PUBLICATIONS

European Search Report for application No. EP 10 192 829 dated May 24, 2011.

* cited by examiner

*Primary Examiner* — Euncha Cherry
(74) *Attorney, Agent, or Firm* — Reising Ethington PC

(57) ABSTRACT

A plastic mirror mounting system is proposed with a substrate made of plastic material coated with at least one reflective layer on a first surface. The plastic material has means to be connected to a mounting structure on the second surface of the plastic glass mirror. The plastic substrate includes at least three plastic mirror clips having at least one shoulder of plastic mirror clip that has a distance from the second surface so that no or almost no stress disturbs the reflective surface.

3 Claims, 4 Drawing Sheets

PLASTIC GLASS MOUNTING AND RETENTION DEVICE

The invention is based on a priority patent application EP 10192829.9 which is hereby incorporated by reference.

BACKGROUND ART

1. Field of the Invention

The present invention relates to a mirror formed on a plastic substrate, the mirror being for use primarily in automotive applications and having means to be mounted to a mounting device.

2. Description of the Related Art

Conventional glass mirrors for automotive use are heavy (especially with the trend towards larger mirrors), tend to be difficult to form aspheric or complex shapes, and are prone to shatter in the case of accidents. The replacement of glass with a plastic substrate would offer the ability to reduce weight, mould complex shapes, integrate retention features on the rear surface of the substrate, and achieve a high level of impact resistance. However, plastic substrates tend to be soft, would be readily damaged by UV radiation, heat and water, and would have a propensity towards causing the reflective surface to craze. In addition to the softness problems that would expect to be introduced by the use of a plastic substrate for mirrors, some reflective layers typically used for mirrors (of any type) that are formed from direct metal deposition (such as of aluminium or silver) also themselves tend to be soft. To minimize this problem with glass substrates, most reflective layers are conventionally applied to the rear surface. However, for reflective metals such as chromium, which are harder and more resistant to the elements by virtue of their chemical and mechanical properties, these metals are predominantly applied to the front surface of glass substrates. However, if this were attempted with a plastic substrate, it would be expected that the reflective coating would exhibit crazing, which would be made worse in durability testing such as thermal cycling, and which would likely also fail other standard tests such as a salt spray test. In the case of plastic mirrors, the reflective layer could be applied to the rear or front surface and a hard coating applied in order to provide environmental exposure protection of the plastic substrate and the reflective coating, whilst providing improved abrasion resistance. However, for an automotive application, a rear surface plastic mirror has not been regarded as suitable as it would be interrupted by any retention/clipping features on the rear of the mirror. Also, in the case of an applied hard coating, interference bands would be present which are cosmetically unacceptable. It would thus be desirable to manufacture a plastic mirror, suitable for automotive applications, which does not craze, which does not have interference fringes and which passes the normal automotive tests such as a salt spray test, thermal cycling and shock tests, and accelerated weathering tests. This type of plastic mirror is known from the not published application AU2009906281.

To implement retention clipping features in the plastic glass substrate is one of the big advantages of plastic mirrors. To use clips in plastic substrates is known from EP2112022. However, the clips described in the document face some problems. If a glass backing plate or another plastic support in a one piece mirror or a glass angle actuator is pressed against the plastic substrate and the clips, stress occurs and influences the reflective appearance of the surface. The stress in the soft plastic material results in visible distortion of the reflective surface which is not acceptable.

SUMMARY OF THE INVENTION

It is the intention of the invention to overcome the problem with stress related distortions in the reflective surface by providing a means of mounting and retention on the second surface of the plastic substrate. The invention also provides assembly and disassembly of the plastic mirror a number of times without affecting the optical qualities of the reflective surface.

The present invention provides a plastic mirror that includes a plastic substrate having a front surface coated with at least a reflective layer and a second surface with a means of mounting and retaining to another device.

DETAILED DESCRIPTION OF THE DRAWINGS

Figure 1:
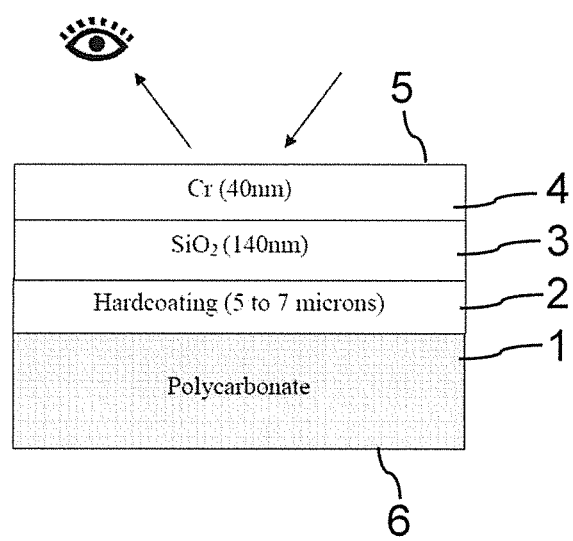
FIG. 1 is a schematic cross section of a plastic mirror

FIG. 1 is a schematic cross section of one embodiment of a plastic minor which could be used in the present invention. In this embodiment, the plastic substrate 1 is polycarbonate, onto which is coated a hard coating 2 in the form of a single abrasion resistant layer about 5 to 7 microns in thickness. An intermediate zone in the form of a single layer 3 of SiO2 is coated onto the hard coat 2 in a thickness of about 140 nm. Coated onto the single layer 3 of SiO2 is a reflective layer 4 of chromium, about 40 nm thick.

The first surface 5 is the front of the mirror and is the side of the minor upon which reflected images are ordinarily viewed by a user. The second surface 6 of the plastic substrate 1 is the side that mounting clips are molded onto that must then be connected to any kind of mounting member.

FIG. 1 is only one embodiment, any other stack of layers for aplitic minor is also mountable with the described mounting solution.

Figure 2:
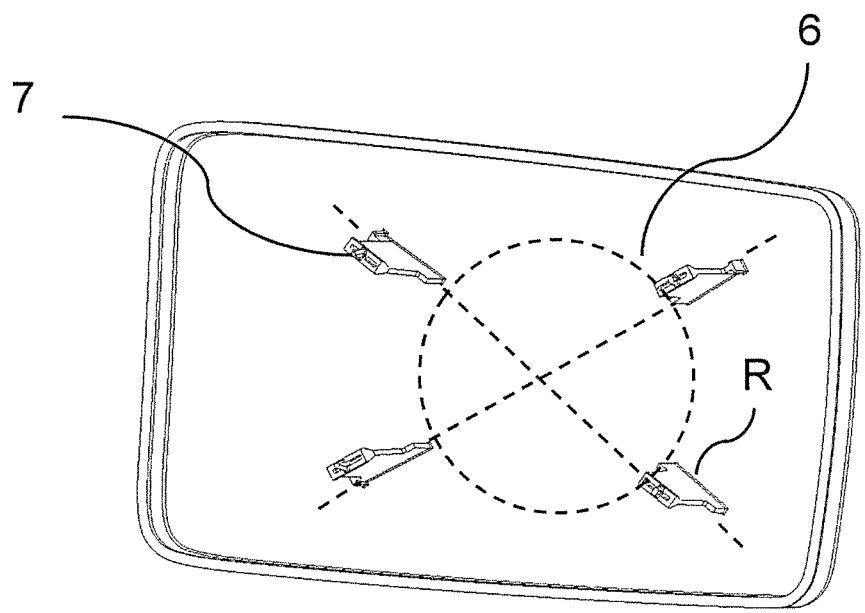
FIG. 2 shows mounting clips on the second surface of a plastic mirror

FIG. 2 shows the plastic mirror second surface 6 with four plastic minor clips 7. The clips 7 are molded in the same process as the plastic substrate 6. The plastic minor clips 7 forms a rip structure where the rips are positioned along a radius R of a virtual circle.

The arrangement of the plastic mirror clip 7 can vary and depends on the related mounted structure and the geometry and performance requirements of the minor assembly. The number of plastic mirror clips 7 depends also on the structure to be assembled. In an alternative embodiment a number of three clips is possible or a number higher than four clips.

The position of the plastic mirror clips on the second surface 6 depends on the mounting structure, too. In a different embodiment the clips are arranged two by two with one side parallel to each others.

The structure of the plastic mirror clip 7 is a none or limited flexible device as counterpart to the flexible clip part of the mounting structure 9.

Figure 3:
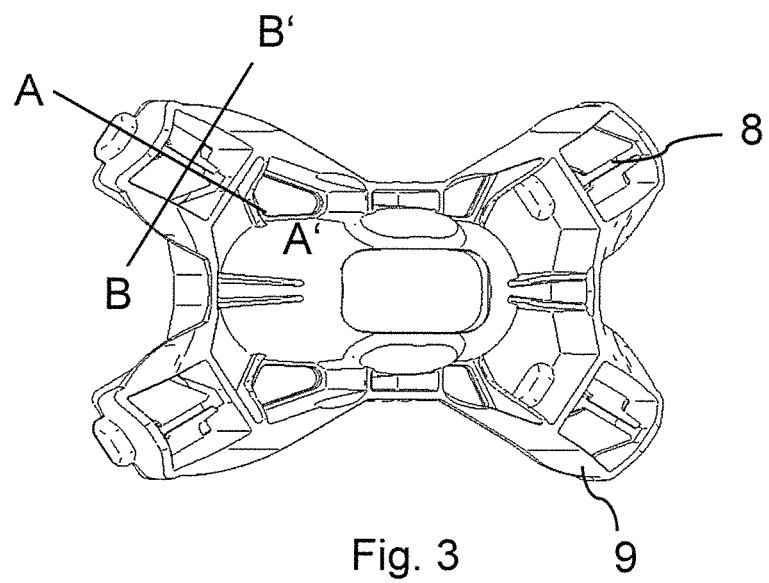
FIG. 3 shows an example of a mounting member

FIG. 3 shows an embodiment of a mounting structure 9 that includes the counterparts of the plastic mirror clips 7 with mounting structure clips 8.

The mounting structure 9 is formed to incorporate the amount and position of mounting structure clips 7 to be connected to the plastic mirror. The mounting structure 9 is a plastic device with four arms including the clips counterparts.

The mounting structure in this design provides the flexing of the clips that engage and attach to the clips 7 that are on the plastic mirror. This eliminates the necessity for the plastic glass clips 7 to flex and therefore reduces or eliminates stress on the second surface 6 of the plastic mirror. The positioning of the mounting structure clips 8 provides stiffness to the plastic glass. This reduces the amount of flex of the first surface during manual adjustment of the plastic mirror. The clips on the mounting structure also provide a residual force to the plastic mirror clips thus eliminating any vibration effects on the reflected image.

Currently these clips are designed to be incorporated also into a motor actuator design so that plastic glass can be assembled to it. For this purpose the mounting structure 9 is integrated into the cover plate of the motor actuator. The mounting structure 9 can be formed as a backing plate in a rear view mirror head that hosts the plastic mirror. The backing plate is attached to the mirror support of the rear view mirror and connected to a mirror base rigid or pivotable.

In a different embodiment is the mounting support part of a mirror head and part of the housing of the mirror head. In EP 1964720 B1 a rear view mirror design is described that uses one piece mirror housing with integrated and fixed backing plate for a mirror glass. In this embodiment the backing plate of one piece mirror housing is molded with the mounting structure clips to fix a plastic mirror.

Figure 4:
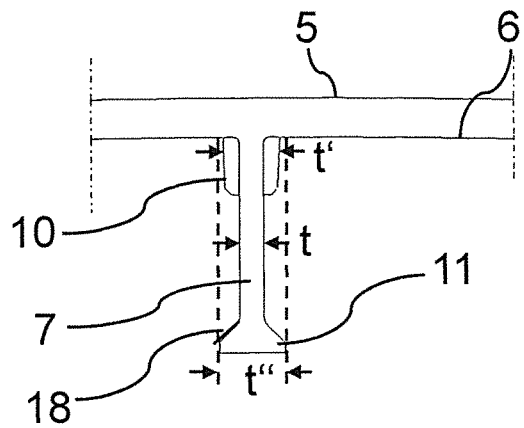
FIGS. 4 and 5 show details of the second surface plastic minor mounting clips

FIG. 4 shows the cross section in direction B-B' for the plastic minor only. The plastic minor clip 7 is a part of the plastic material of the minor substrate. The clip 7 has a thickness t that is approximately 1 to 4 mm.

At the second surface 6 the plastic minor the clips 7 have shoulders 10 that enlarge the thickness of the clips to t'. This shoulder incorporates an inclination that eliminates or reduces relative motion between the plastic minor and the mounting member. At the open end of the clip 7 a rectangular enlargement 11 broadens the thickness of the clips 7 to t''. This enlargement 11 determines the assembly force of the plastic minor to the mounting member and its design thickness can be adjusted to specific requirements. Between t'' and t is an inclination 18. This inclination assists in controlling the disassembly force of the plastic minor to the mounting member and also provides a residual force when the plastic minor is assembled to the mounting structure. This residual force reduces or eliminates relative motion between the minor glass and the mounting member.

The thickness of the shoulder 10 is only limited by the material that is used to mold the structure. The shoulder 10 provides a larger area of contact with the plastic minor and reduces or eliminates relative motion between the plastic minor and the mounting member.

Figure 5:
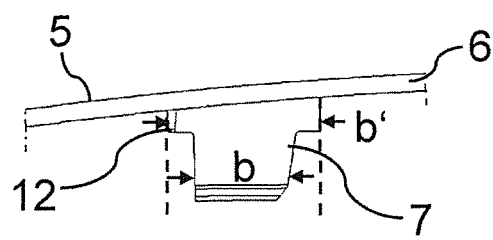

FIG. 5 shows the plastic minor clip 7 in a cross section along A-A'. The clip has an extension b with a broadening 12 at the second surface of 6 of plastic glass. The broadening 12 increases the extension to b'. The broadening forms a mounting hard point to support the mounting structure clips 8.

Figure 6:
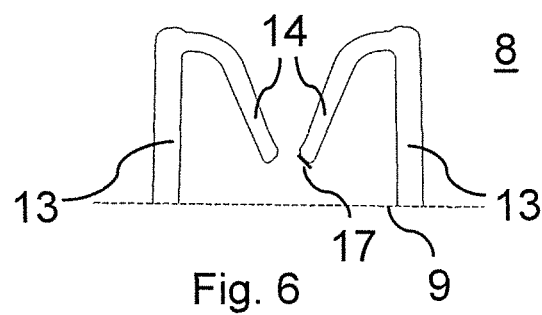
FIG. 6 shows details of the mounting member clips

In FIG. 6 a cross section along B-B' of mounting structure clips 8 is shown. The mounting structure clips has a rigid aim 13 and a flexible aim 14 which is designed to branch in a flat angle from the rigid arm. To avoid stress and strain when using the clips, and to assist in part assembly, the connection between the two arms is designed in a smooth curved way.

Figure 7:
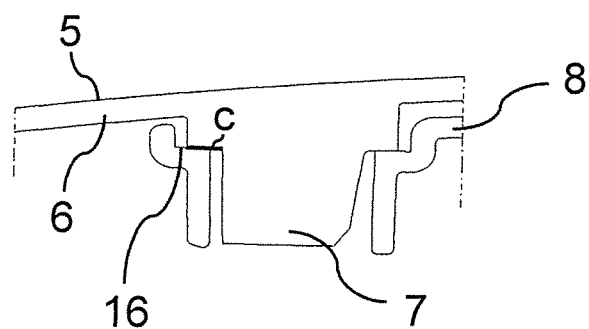
FIGS. 7 and 8 show details of the second surface plastic mirror mounting clips assembled to the mounting member clips

FIG. 7 shows a cross section along A-A' with the two clips connected to each other.

The mounting structure clip 8 forms a stepped retainer 16 that fits to the broadening 12 of the plastic minor clips 7. The area c is the reaction support. The load of connection is isolated from reflective surface. The forces on area c are spread over the larger area of connection between plastic mirror clips and second surface of plastic mirror.

Figure 8:
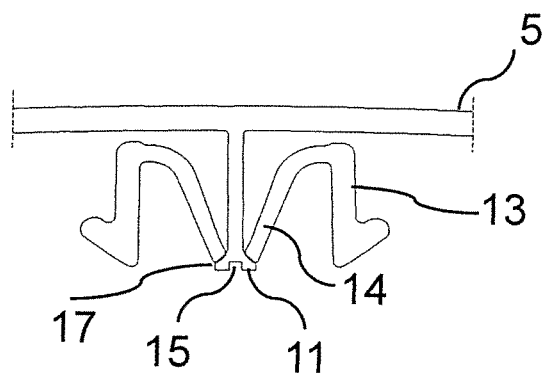

FIG. 8 shows the cross section along B-B' in connected status. The flexible arms 14 of mounting structure clips 8 are pressed against the rectangular enlargement of plastic mirror clip 11 and the inclination 18. The inclination of the end facets of the flexible arms are adapted to fit to the angle of the enlargement of plastic mirror clip 11. The rectangular face of the enlargement of the plastic mirror clip 11 and the broadening 12 forms the form-locking connection between the two parts of the clips.

The plastic mirror is mounted to the support structure by lateral movement of the clips 7 between the two flexible arms 14 of clip 8. The movement stops when clip 8 contacts the retainer of the broadening 12 of clips 7. At this position the end faces 17 of the flexible arms 14 contact the lower part of the rectangular enlargement 11 and the inclination 18.

The two contact surfaces 18 and 17 secure the connection between the two parts of the clips and provide a residual force between the two parts.

The contact area c between the clips has a distance from the second surface so that no or almost no stress disturbs the reflective surface. The contact forces are spread over a larger contact area defined by the broadening 12 of the plastic mirror clips and the shoulders 10 of the plastic mirror clips.

Legend:
1 substrate
2 hard coating
3 layer of SiO2
4 layer of chromium
5 first surface
6 second surface
7 plastic mirror clip
8 mounting structure clip
9 mounting structure
10 shoulder of plastic minor clip
11 enlargement of plastic minor clip
12 broadening of plastic minor clip
13 rigid arm
14 flexible arm
15 indentations
16 retainer
17 end face
18 inclination

The invention claimed is:

1. A plastic mirror mounting system for a rear view mirror secured to a vehicle comprising a plastic substrate made of plastic material coated with at least one reflective layer on a first surface and having at least three plastic mirror clips, extending out from the second surface of the plastic mirror, to be connected to a mounting structure wherein
   each plastic mirror clip having at least one shoulder that enlarges the contact area between the plastic mirror clip and the second surface, and
   each plastic mirror clip having a broadening that has a distance from the second surface, and each plastic mirror clip including an enlargement and an inner inclination at the end, and the mounting structure has mounting structure clips with rigid arms and localized flexible arms, with each mounting structure clip having a stepped structure forming a stepped retainer that fits to the broadening of the plastic mirror clips, and the flexible arms contacting the enlargement and inclination of the plastic mirror clips such that the end faces of the flexible arms and the inclination secure the connection.

2. A plastic mirror mounting system according claim 1 wherein the enlargement has a rectangular form.

3. A plastic mirror mounting system according to anyone of the previous claims wherein the mounting structure is at least a part of a backing plate, or is a part of a cover plate of a motor actuator, or is part of one piece mirror housing.

\* \* \* \* \*